(12) United States Patent
Xie et al.

(10) Patent No.: US 10,816,640 B2
(45) Date of Patent: Oct. 27, 2020

(54) FOLLOWING METHOD AND DEVICE FOR UNMANNED AERIAL VEHICLE AND WEARABLE DEVICE

(71) Applicant: Goertek Inc., Weifang (CN)

(72) Inventors: Fuli Xie, Weifang (CN); Pengcheng Su, Weifang (CN)

(73) Assignee: Goertek Inc., Weifang (CN)

( * ) Notice: Subject to any disclaimer, the term of this patent is extended or adjusted under 35 U.S.C. 154(b) by 38 days.

(21) Appl. No.: 16/079,099

(22) PCT Filed: Mar. 10, 2017

(86) PCT No.: PCT/CN2017/076218
§ 371 (c)(1),
(2) Date: Aug. 23, 2018

(87) PCT Pub. No.: WO2017/152865
PCT Pub. Date: Sep. 14, 2017

(65) Prior Publication Data
US 2019/0011531 A1    Jan. 10, 2019

(30) Foreign Application Priority Data
Mar. 11, 2016 (CN) .......................... 2016 1 0140751

(51) Int. Cl.
*G01S 5/30* (2006.01)
*G01S 5/22* (2006.01)
(Continued)

(52) U.S. Cl.
CPC .................. *G01S 5/30* (2013.01); *G01S 5/16* (2013.01); *G01S 5/22* (2013.01); *G05D 1/101* (2013.01);
(Continued)

(58) Field of Classification Search
CPC .. G01S 5/30; G01S 5/22; G05D 1/101; G05D 1/12; B64C 2201/027; B64C 2201/141; B64C 2201/024; B64C 39/024
See application file for complete search history.

(56) References Cited

U.S. PATENT DOCUMENTS 9,513,629 B1 * 12/2016 Thorn .................. A61B 5/7278
2010/0084513 A1 * 4/2010 Gariepy ................ B64C 39/024
244/190

(Continued)

FOREIGN PATENT DOCUMENTS

CN    102551993 A    7/2012
CN    203102612 U    7/2013
(Continued)

OTHER PUBLICATIONS

Machine Translation of Tang, CN104991573 A, Locating and tracking method and apparatus based on sound source array, 2015, China.*

(Continued)

*Primary Examiner* — Rami Khatib
(74) *Attorney, Agent, or Firm* — LKGlobal | Lorenz & Kopf, LLP

(57) ABSTRACT

A following method and device for an unmanned aerial vehicle and a wearable device are provided. The following method comprises: installing a plurality of receiving sensors on the unmanned aerial vehicle, wherein the plurality of receiving sensors match with one transmitting sensor in a smart control device at the user side; receiving a distance signal transmitted by the user in real time by using the receiving sensors, and calculating a relative position of the unmanned aerial vehicle with respect to the user according to the distance signal; and adjusting the horizontal position of the unmanned aerial vehicle according to the relative position, so that the relative position of the unmanned aerial
(Continued)

vehicle with respect to the user agrees with a preset position, to realize automatic following of the unmanned aerial vehicle.

15 Claims, 2 Drawing Sheets

(51) Int. Cl.
*G01S 5/16* (2006.01)
*G05D 1/10* (2006.01)
*B64C 39/02* (2006.01)
*G05D 1/12* (2006.01)

(52) U.S. Cl.
CPC ...... *B64C 39/024* (2013.01); *B64C 2201/024* (2013.01); *B64C 2201/027* (2013.01); *B64C 2201/141* (2013.01); *G05D 1/12* (2013.01)

(56) References Cited

U.S. PATENT DOCUMENTS

| | | | | |
|---|---|---|---|---|
| 2013/0268185 | A1* | 10/2013 | Rabbath | G05D 1/021 701/300 |
| 2015/0134143 | A1 | 5/2015 | Willenborg | |
| 2015/0205301 | A1* | 7/2015 | Gilmore | G05D 1/101 701/11 |
| 2015/0370250 | A1* | 12/2015 | Bachrach | G05D 1/0016 701/2 |
| 2016/0101856 | A1* | 4/2016 | Kohstall | G05D 1/101 244/17.13 |
| 2018/0259953 | A1* | 9/2018 | Park | B64C 39/024 |
| 2018/0300895 | A1* | 10/2018 | Huber | G06T 7/20 |

FOREIGN PATENT DOCUMENTS

| | | | |
|---|---|---|---|
| CN | 104260092 | A | 1/2015 |
| CN | 104270563 | A | 1/2015 |
| CN | 104991573 | A | 10/2015 |
| CN | 105045281 | A | 11/2015 |
| CN | 105116859 | A | 12/2015 |
| CN | 105182348 | A | 12/2015 |
| CN | 105185083 | A | 12/2015 |
| CN | 105717489 | A | 6/2016 |

OTHER PUBLICATIONS

International Bureau of WIPO, International Search Report and Written Opinion in Application No. PCT/CN2017/076218 dated Jun. 13, 2017.
Chinese Patent Office, Examination Report in Application No. 201610140751.2 dated Sep. 4, 2017.
Chinese Patent Office, Examination Report in Application No. 201610140751.2 dated May 9, 2018.

* cited by examiner

FOLLOWING METHOD AND DEVICE FOR UNMANNED AERIAL VEHICLE AND WEARABLE DEVICE

CROSS REFERENCE TO RELATED APPLICATIONS

This Application is a U.S. National Stage entry under 35 U.S.C. § 371 based on International Application No. PCT/CN2017/076218, filed on Mar. 10, 2017, which was published under PCT Article 21(2) and which claims priority to Chinese Patent Application No. 201610140751.2, filed on Mar. 11, 2016 which are all hereby incorporated herein by reference in their entirety.

TECHNICAL FIELD

This Application pertains to the field of human-machine interaction, and particularly relates to a following method and device for an unmanned aerial vehicle and a wearable device.

BACKGROUND

As technology advances, artificial intelligence has gradually extended to consumer level electronic products, and smart phones have become a necessity. Along with the promotion of life quality, unmanned aerial vehicles are entering the daily life of people, and miniature multiple-rotor-wing unmanned aerial vehicles have now become an affordable consumption product for most people.

Unmanned aerial vehicles generally carry movement state detection sensors such as acceleration sensor and gyroscope, and use Bluetooth and Wi-Fi data transmission techniques, to satisfy the demands of unmanned aerial vehicles on flight control and state detection. However, commonly used data transmission techniques such as Bluetooth and Wi-Fi can only achieve wireless data communication between unmanned aerial vehicles and signal transmission devices, and cannot realize automatic following, so the user experience is poor. In addition, other objects, desirable features and characteristics will become apparent from the subsequent summary and detailed description, and the appended claims, taken in conjunction with the accompanying drawings and this background.

SUMMARY

This Application provides a following method and device for an unmanned aerial vehicle and a wearable device, to solve the problem in the prior art that unmanned aerial vehicles cannot realize automatic following and the user experience is poor.

According to an aspect of this Application, there is provided a following method for an unmanned aerial vehicle, wherein the method comprises:

installing a plurality of receiving sensors on the unmanned aerial vehicle, wherein the plurality of receiving sensors match with one transmitting sensor in a smart control device at a user side;

receiving a distance signal transmitted by the user in real time by using the receiving sensors, and calculating a relative position of the unmanned aerial vehicle with respect to the user according to the distance signal; and adjusting a horizontal position of the unmanned aerial vehicle according to the relative position so that the relative position of the unmanned aerial vehicle with respect to the user agrees with a preset position, to realize automatic following of the unmanned aerial vehicle.

Optionally, the step of installing a plurality of receiving sensors on the unmanned aerial vehicle comprises:

installing at least three ultrasonic receiving sensors at different locations on the unmanned aerial vehicle, wherein the ultrasonic receiving sensors match with one ultrasonic transmitting sensor in the smart control device at the user side.

Optionally, the step of calculating a relative position of the unmanned aerial vehicle with respect to the user according to the received distance signal comprises:

calculating distances from the user to each of the ultrasonic receiving sensors on the unmanned aerial vehicle according to time of the ultrasonic signals transmitted by the user reaching each of the ultrasonic receiving sensors on the unmanned aerial vehicle respectively; and calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors.

Optionally, the step of calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors comprises:

installing four ultrasonic receiving sensors on the unmanned aerial vehicle, wherein the unmanned aerial vehicle is a quad-rotor unmanned aerial vehicle, and, configuring the locations of the ultrasonic receiving sensors to make its connecting lines of locations form a cross, and its cross point to be the center point of the unmanned aerial vehicle.

Optionally, installing each of the ultrasonic receiving sensors under one rotor wing of the quad-rotor unmanned aerial vehicle respectively.

Optionally, the step of calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors comprises:

establishing a space rectangular coordinate system by using the center point of the unmanned aerial vehicle as an origin, a direction of the connecting line of the two ultrasonic receiving sensors which passes through the origin as a horizontal coordinate axis, and a direction perpendicular to the horizontal coordinate axis as a vertical coordinate axis, and calculating coordinate values of a current location of the user by using the following formulas:

$$\begin{cases} (y-l)^2 + x^2 + z^2 = n_2^2 \\ (y-l)^2 + x^2 + z^2 = n_3^2 \\ (x-l)^2 + y^2 + z^2 = n_4^2 \\ (x+l)^2 + y^2 + z^2 = n_1^2 \end{cases}$$

where (x, y, z) is a current location coordinate of the user, l is a distance from the center point of the unmanned aerial vehicle to each of the ultrasonic receiving sensors, $n_1$ is a distance from the user to a first ultrasonic receiving sensor, $n_2$ is a distance from the user to a second ultrasonic receiving sensor, $n_3$ is a distance from the user to a third ultrasonic receiving sensor, and $n_4$ is a distance from the user to a fourth ultrasonic receiving sensor; and obtaining the relative position of the center point of the unmanned aerial vehicle with respect to the user according to the coordinate values of the current location of the user.

Optionally, the step of adjusting a relative horizontal position of the unmanned aerial vehicle with respect to the user according to the position so that the relative position of the unmanned aerial vehicle with respect to the user agrees with preset position information comprises:

adjusting the horizontal position of the unmanned aerial vehicle with respect to the user by adjusting a flying speed of the unmanned aerial vehicle with a proportion integration differentiation controller (PID) according to the relative position of the unmanned aerial vehicle with respect to the user, so that the relative position of the unmanned aerial vehicle with respect to the user agrees with the preset position, to realize automatic following.

As corresponding to the above method, this Application further provides a following device for an unmanned aerial vehicle, wherein the unmanned aerial vehicle is installed with a plurality of receiving sensors, the plurality of receiving sensors match with one transmitting sensor in a smart control device at the user side, and the device for following an unmanned aerial vehicle comprises:

a positioning module, for receiving a distance signal transmitted by the user in real time by using the receiving sensors, and calculating a relative position of the unmanned aerial vehicle with respect to the user according to the distance signal; and a tracking module, for adjusting a horizontal position of the unmanned aerial vehicle according to the relative position of the unmanned aerial vehicle with respect to the user calculated by the positioning module, so that the relative position of the unmanned aerial vehicle with respect to the user agrees with a preset position, to realize automatic following of the unmanned aerial vehicle.

Optionally, at least three ultrasonic receiving sensors are installed at different locations on the unmanned aerial vehicle, and the ultrasonic receiving sensors match with one ultrasonic transmitting sensor in the smart control device at the user side; and the positioning module is particularly for, calculating distances from the user to each of the ultrasonic receiving sensors on the unmanned aerial vehicle according to time of the ultrasonic signals transmitted by the user reaching each of the ultrasonic receiving sensors on the unmanned aerial vehicle respectively; and calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors.

Optionally, four ultrasonic receiving sensors are installed on the unmanned aerial vehicle, the unmanned aerial vehicle is a quad-rotor unmanned aerial vehicle, configuring the locations of the ultrasonic receiving sensors to make its connecting lines form a cross, and its cross point to be the center point of the unmanned aerial vehicle; and the positioning module is particularly for, establishing a space rectangular coordinate system by using the center point of the unmanned aerial vehicle as an origin, a direction of the connecting line of two ultrasonic receiving sensors which passes through the origin as a horizontal coordinate axis, and a direction perpendicular to the horizontal coordinate axis as a vertical coordinate axis, and calculating coordinate values of a current location of the user by using the following formulas:

$$\begin{cases} (y-l)^2 + x^2 + z^2 = n_2^2 \\ (y-l)^2 + x^2 + z^2 = n_3^2 \\ (x-l)^2 + y^2 + z^2 = n_4^2 \\ (x+l)^2 + y^2 + z^2 = n_1^2 \end{cases}$$

where (x, y, z) is a current location coordinate of the user, l is a distance from the center point of the unmanned aerial vehicle to each of the ultrasonic receiving sensors, $n_1$ is a distance from the user to a first ultrasonic receiving sensor, $n_2$ is a distance from the user to a second ultrasonic receiving sensor, $n_3$ is a distance from the user to a third ultrasonic receiving sensor, and $n_4$ is a distance from the user to a fourth ultrasonic receiving sensor; and obtaining the relative position of the center point of the unmanned aerial vehicle with respect to the user according to the coordinate values of the current location of the user.

According to yet another aspect of this Application, there is provided a wearable device provided with one transmitting sensor; and the transmitting sensor matches with a plurality of receiving sensors on an unmanned aerial vehicle, and is for transmitting a distance signal to the unmanned aerial vehicle in real time, to enable the unmanned aerial vehicle to calculate a relative position of the unmanned aerial vehicle with respect to a user according to the received distance signal, and adjust a horizontal position of the unmanned aerial vehicle according to the relative position, so that the relative position of the unmanned aerial vehicle with respect to the user agrees with a preset position.

Optionally, the wearable device is a smart watch, an smart bracelet, smart glasses or an smart earphone, the transmitting sensor is an infrared transmitting sensor, and the receiving sensors are infrared receiving sensors.

The following method and device for an unmanned aerial vehicle according to this Application, calculates the current relative position of the unmanned aerial vehicle with respect to the user by using the distance signals transmitted in real time by the smart control device at the user side, and adjusts the relative position of the unmanned aerial vehicle with respect to the user to the preset position based on the relative position, according to the above technical proposal, it can maintain the relatively stationary relation between the unmanned aerial vehicle and the user at the preset position, provide a solution to implement the automatic following of unmanned aerial vehicles, enrich the functions of unmanned aerial vehicle products, and improve the competitiveness of unmanned aerial vehicle products. In addition, this Application further provides a wearable device, and the transmitting sensor provided in the wearable device can transmit signals to a plurality of matching receiving sensors on the unmanned aerial vehicle, so as to realize the automatic following by the unmanned aerial vehicle to the user wearing the wearable device, thereby greatly promoting the user experience.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the Application and uses of the invention. Furthermore, there is no intention to be bound by any theory presented in the preceding background of the invention or the following detailed description.

The inventive concept of this Application is as follows. Regarding the problem that the existing unmanned aerial vehicles cannot automatically follow, this Application determines the relative location relation between the unmanned aerial vehicle and the user by using a single-transmission multiple-receiving sensor module, finely adjusts the location of the unmanned aerial vehicle according to the relative location relation, maintains the relatively stationary relation between the unmanned aerial vehicle and the user, and thus realizes the automatic following function of the unmanned aerial vehicle.

First Embodiment

Figure 1:
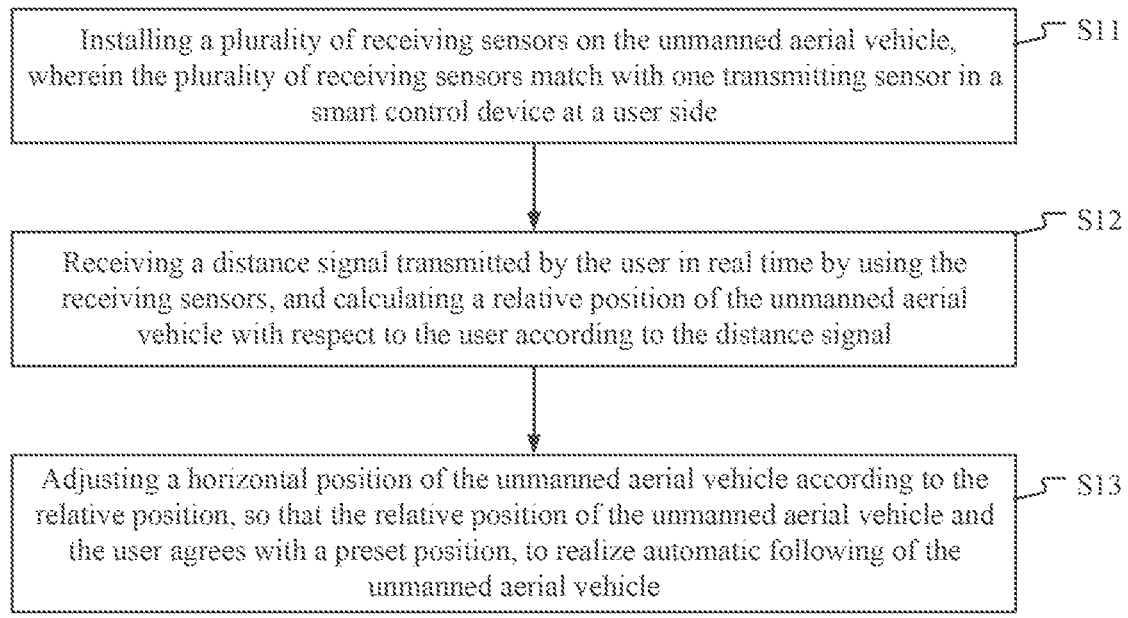
FIG. 1 is a schematic flow diagram of a following method for an unmanned aerial vehicle according to an embodiment of this Application.

FIG. 1 is a schematic flow diagram of a following method for an unmanned aerial vehicle according to an embodiment of this Application. Referring to FIG. 1, the following method for an unmanned aerial vehicle comprises the steps as below:

Step S11, a plurality of receiving sensors are installed on the unmanned aerial vehicle, and the plurality of receiving sensors match with one transmitting sensor in a user side smart control device.

The "match" herein refers to at least, the types of the receiving sensors and the transmitting sensor match, and the identities of the receiving sensors and the transmitting sensor match. For example, when the receiving sensors are ultrasonic sensors, the transmitting sensor also uses an ultrasonic sensor, to ensure that the types of the transmitting sensor and the receiving sensors are the same. Another example, in the initialization process, the receiving sensors receive a pairing connection request from the transmitting sensor to complete identity authentication, to prevent the interference from other devices.

Step S12, the unmanned aerial vehicle receives a distance signal transmitted by the user in real time by using the receiving sensors, and calculates a relative position of the unmanned aerial vehicle with respect to the user according to the distance signal. The position of the user comprises the direction information and location information of the user in space.

Step S13, the unmanned aerial vehicle adjusts a horizontal position of the unmanned aerial vehicle according to the relative position, so that the relative position of the unmanned aerial vehicle and the user agrees with a preset position, to realize automatic following of the unmanned aerial vehicle.

Herein, the horizontal position of the unmanned aerial vehicle refers to the location of the unmanned aerial vehicle in the horizontal direction, the horizontal direction is vertical to the vertical direction of the unmanned aerial vehicle. The horizontal position refers to the location at a predetermined height of the unmanned aerial vehicle above the user and on the circumference of a circle with the user as its center and a predetermined value as its radius.

To activate the automatic following mode of the unmanned aerial vehicle, the flying height of the unmanned aerial vehicle must be set first, and the unmanned aerial vehicle should maintain its flying height constant when there is not an exceptional circumstance. In this way, by means of the time difference between the distance signals received by the receiving sensors at different positions on the unmanned aerial vehicle, the accurate relative position of the unmanned aerial vehicle with respect to the user can be deduced, and then according to the relative position the location of the unmanned aerial vehicle, in the horizontal direction is adjusted to a preset position, to realize the automatic following of the unmanned aerial vehicle to the user.

In the present embodiment, the smart control device at the user side may be a wearable device such as a smart watch or a smart bracelet.

By using the method shown in FIG. 1, the unmanned aerial vehicle receives the distance signals sent by the user side by using the plurality of receiving sensors installed and calculates the relative position of the unmanned aerial vehicle with respect to the user, and controls the horizontal position of the unmanned aerial vehicle according to the calculated relative position, so that the relative position of the unmanned aerial vehicle with respect to the user agrees with the preset position. Accordingly, when the user is moving (for example, running), the unmanned aerial vehicle can automatically follow the changes of the position of the user, maintain its relative position with respect to the user, thereby improving the user experience.

Second Embodiment

Ultrasonic signal has advantages in near field signal transmission, such as, small influence by environment and lighting factors, stable transmission and strong anti-interference, and is an ideal media for realizing automatic following of unmanned aerial vehicles. Therefore, in the present embodiment, as an example, the positioning of the user by an unmanned aerial vehicle in the following method of the unmanned aerial vehicle is emphatically described, in which the receiving sensors are ultrasonic receiving sensors and the transmitting sensor is an ultrasonic transmitting sensor, and other contents may be referred to the description of the other embodiments of this Application.

In the present embodiment, at least three ultrasonic receiving sensors are installed on the unmanned aerial vehicle, and the relative position between the user and the unmanned aerial vehicle is calculated according to the ultrasonic signals transmitted by the ultrasonic transmitting sensor installed in the smart control device at the user side.

The principle of the positioning algorithm adopted by the present embodiment is similar to the positioning principle of GPS (Global Positioning System). The difference lies in that, the signal transmitting end of GPS positioning is the satellite, and the signal receiving end is located on the object to be positioned; on the contrary, in the positioning algorithm of the present embodiment, the signal receiving end is located on the unmanned aerial vehicle, and the signal transmitting end is located on the device to be positioned.

Because the positions of the ultrasonic receiving sensors on the unmanned aerial vehicle are fixed, the distances from the user to the different ultrasonic receiving sensors on the unmanned aerial vehicle can be obtained by using the time differences of the ultrasonic signals transmitted by the user side to reach the different ultrasonic receiving sensors. Herein, the ultrasonic signal transmitted from the ultrasonic transmitting sensor carries transmission time information, and when the ultrasonic signal reaches each of the ultrasonic receiving sensors on the unmanned aerial vehicle, each of the ultrasonic receiving sensors obtains different arrival time. At this point, each of the ultrasonic sensors can calculate a time difference t between the arrival time and the transmission time, and then according to the propagation speed of ultrasonic in the air 340 m/s, the distance(s) from the ultrasonic transmitting sensor to each of the ultrasonic receiving sensors can be calculated, namely, s=340 t.

After calculating the distances from the user to each of the ultrasonic receiving sensors on the unmanned aerial vehicle, the relative position of the center point of the unmanned aerial vehicle with respect to the user is obtained by calculating according to the location of the center point of the unmanned aerial vehicle and the distances from the center point of the unmanned aerial vehicle to each of the ultrasonic receiving sensors, thereby obtaining the relative position of the unmanned aerial vehicle with respect to the user. The relative position of the unmanned aerial vehicle with respect to the user is compared with a preset position. If the relative position does not agree with the preset position, a controlling signal is calculated by using controllers such as PID (Proportion Integration Differentiation) and outputted to the electrical motors of the rotor wings of the unmanned aerial vehicle, the flying speed of the unmanned aerial vehicle is adjusted, and then the location of the unmanned aerial vehicle in the horizontal direction is adjusted by adjusting the flying speed of the unmanned aerial vehicle, to ensure that the location of the unmanned aerial vehicle is always around the target, to realize automatic following. Since the unmanned aerial vehicle keeps unchanged in the vertical direction or the direction of height, the location in the vertical direction need not be adjusted.

It should be noted that, as an illustrative application scenario of the following method for an unmanned aerial vehicle in the present embodiment, a relative position between the unmanned aerial vehicle and the user is preset, for example, the unmanned aerial vehicle is set at the left front of the user and the height of the unmanned aerial vehicle is fixed. When the user is in a moving state (such as running and bicycling), the horizontal position of the unmanned aerial vehicle with respect to the user may change, for example, the unmanned aerial vehicle may fly at the left back of the user. At this point, the relative position of the unmanned aerial vehicle with respect to the user is calculated by using the following method for an unmanned aerial vehicle of the present embodiment, and when finding that the position (left back) does not agree with the preset position (left front), the unmanned aerial vehicle adjusts its flying speed (for example, increasing the rotational speed of the corresponding rotor wing), so that the relative position of the unmanned aerial vehicle with respect to the user is adjusted to the preset position, to realize the automatic following to the user.

Third Embodiment

Figure 2:
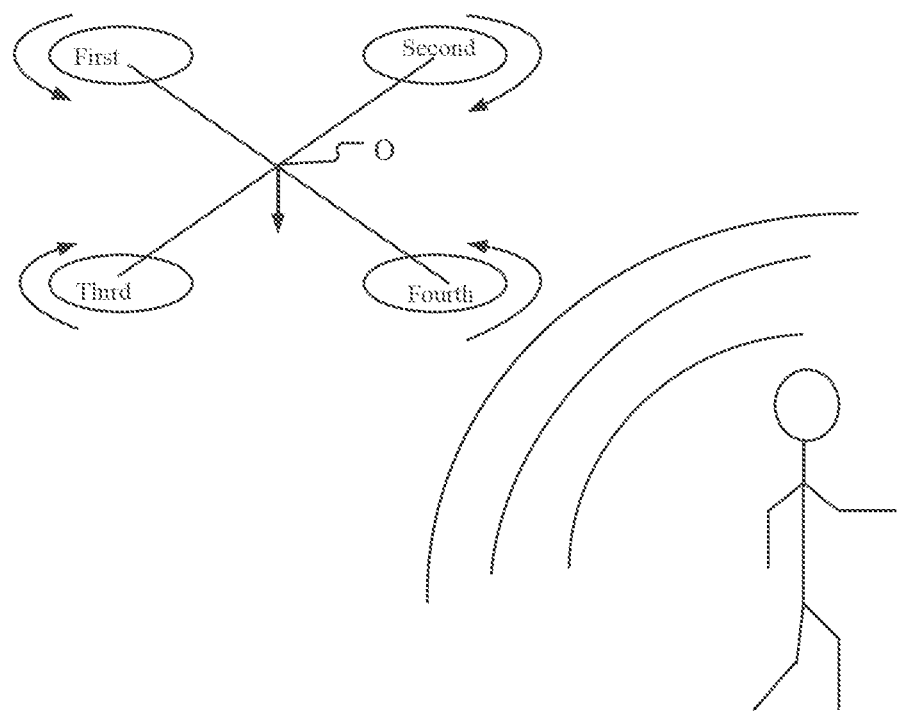
FIG. 2 is a schematic diagram of the relative position of an unmanned aerial vehicle with respect to a user according to an embodiment of this Application.
Figure 3:
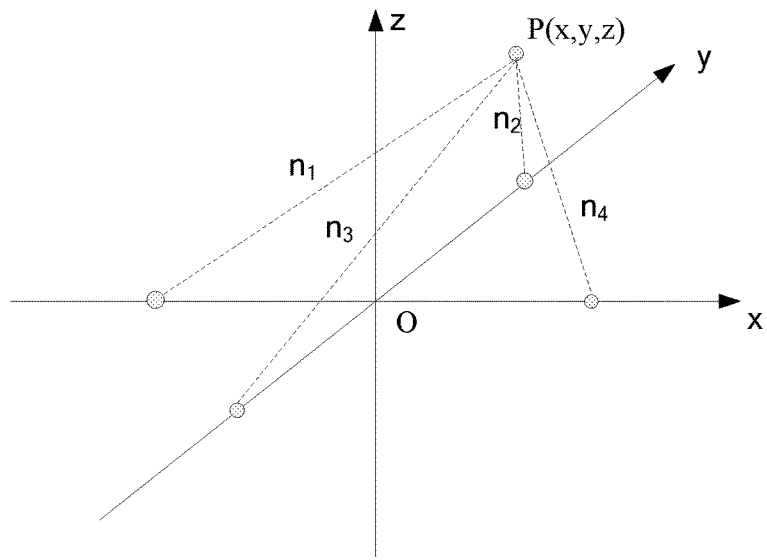
FIG. 3 is a schematic diagram of a space rectangular coordinate system established based on the position relation of the unmanned aerial vehicle and the user according to an embodiment of this Application.

FIG. 2 is a schematic diagram of the relative position of an unmanned aerial vehicle with respect to the user according to an embodiment of this Application. FIG. 3 is a schematic diagram of a space rectangular coordinate system established based on the position relation of the unmanned aerial vehicle and the user according to an embodiment of this Application. Referring to FIGS. 2 and 3, the process of calculating the relative position of the unmanned aerial vehicle with respect to the user is illustratively described in the present embodiment.

It can be seen from FIG. 2 that the unmanned aerial vehicle of the present embodiment is a quad-rotor unmanned aerial vehicle. The quad-rotor aerial vehicle changes the rotational speeds of the rotor wings by adjusting the rotational speeds of four electrical motors, to realize the changes of the flying speed and the lift force, thereby controlling the attitude and location of the unmanned aerial vehicle. The quad-rotor aerial vehicle carries four ultrasonic signal receiving sensors which are located under the rotor wing shafts respectively, and an ultrasonic signal transmitting sensor that matches with the four ultrasonic receiving sensors is located on the smart control device at the user side.

The four ultrasonic receiving sensors shown in FIG. 2 include a first ultrasonic receiving sensor, a second ultrasonic receiving sensor, a third ultrasonic receiving sensor and a fourth ultrasonic receiving sensor. It can be seen from FIG. 2 that, the connecting line of the locations of the first ultrasonic receiving sensor and the fourth ultrasonic receiving sensor and the connecting line of the locations of the second ultrasonic receiving sensor and the third ultrasonic receiving sensor form a cross, the cross point O is the center point of the unmanned aerial vehicle, and the distances from the center point of the unmanned aerial vehicle to each of the ultrasonic receiving sensors are all equal.

It should be noted that, in practical use, before the transmission of the ultrasonic signals, the ultrasonic signals need to be matched and identified to prevent the probable interference from other devices. In other words, a pairing connection between the ultrasonic receiving sensors and the ultrasonic transmitting sensor is established.

In the present embodiment, a space rectangular coordinate system (Oxyz) is established by using the center point of the unmanned aerial vehicle as an origin, the connecting line of the locations of the ultrasonic sensors on the opposite cantilevers as a horizontal coordinate axis, and a direction perpendicular to the horizontal coordinate axis as a vertical coordinate axis.

Referring to FIG. 3, the origin O of the rectangular coordinate system is located at the cross point of cantilevers of four rotor wings of the unmanned aerial vehicle, the cantilever where the first and the fourth ultrasonic receiving sensors are located is the x axis, the cantilever where the second and the third ultrasonic receiving sensors are located is the y axis, the x axis and the y axis are horizontal coordinate axes, and the second and the fourth ultrasonic receiving sensors are respectively located in the positive directions of the x axis and the y axis. The flying height of the unmanned aerial vehicle is known, so the distances from the user to the different ultrasonic receiving sensors on the unmanned aerial vehicle can be obtained by using the difference between time taken by the ultrasonic signals transmitted by the user side to reach the different ultrasonic receiving sensors, and the relative position between the origin O and the user is obtained by using those known parameters. The current location of the user is defined as point P with the coordinate (x, y, z), and the four points on the coordinate axes x and y represent the locations of the ultrasonic receiving sensors respectively. The propagation speed of ultrasonic in the air is known to be about 340 m/s, so the distance between the signal transmission point and the receiving point can be calculated backward by using the propagation durations of the ultrasonic signals.

The distances from the ultrasonic transmitted by the smart control device at the user side to the four ultrasonic receiving sensors are n1, n2, n3, and n4, and the distance between the point P and the center point may be calculated by using the following equation set:

$$\begin{cases} (y-l)^2 + x^2 + z^2 = n_2^2 \\ (y+l)^2 + x^2 + z^2 = n_3^2 \\ (x-l)^2 + y^2 + z^2 = n_4^2 \\ (x+l)^2 + y^2 + z^2 = n_1^2 \end{cases}$$

where l is a distance from the center point of the unmanned aerial vehicle to each of the ultrasonic receiving sensors, $n_1$ is a distance from the user to a first ultrasonic receiving sensor, $n_2$ is a distance from the user to a second ultrasonic receiving sensor, $n_3$ is a distance from the user to a third ultrasonic receiving sensor, and $n_4$ is a distance from the user to a fourth ultrasonic receiving sensor.

The above is a transcendental equation set, and theoretically a determined solution can be obtained by only three equations in the equation set. Therefore, the unmanned aerial vehicle requires a minimum of three receiving sensors to determine the coordinate of the target (namely, the user), and increasing the number of the receiving sensors can improve the accuracy of the positioning to a certain extent and thus improve the accuracy of the automatic following.

By solving the above equation set, the coordinate values of the point P can be determined, in other words, the current relative position of the center point of the unmanned aerial vehicle with respect to the user can be determined.

After obtaining the relative position of the unmanned aerial vehicle with respect to the current location of the user, the horizontal location of the unmanned aerial vehicle may be controlled by using a PID controller, to ensure that the unmanned aerial vehicle is always located around the target, to realize automatic following.

It should be noted that, in the present embodiment, the terms such as the first ultrasonic receiving sensor and the second ultrasonic receiving sensor do not limit the order or numbers of the ultrasonic receiving sensors, and are merely intended to differentiate devices that have the same or similar function.

Fourth Embodiment

Figure 4:
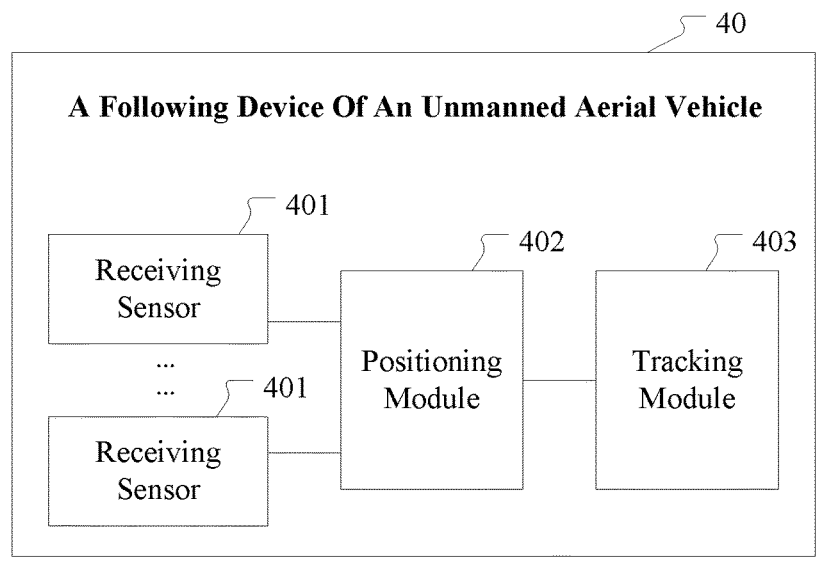
FIG. 4 is a structural block diagram of a following device for an unmanned aerial vehicle according to an embodiment of this Application.

FIG. 4 is a structural block diagram of a following device for an unmanned aerial vehicle according to an embodiment of this Application. Referring to FIG. 4, a plurality of receiving sensors 401 are installed on the unmanned aerial vehicle, and the plurality of receiving sensors 401 match with one transmitting sensor in a smart control device at the user side. The device for following an unmanned aerial vehicle 40 comprises:

a positioning module 402, for receiving a distance signal transmitted by the user in real time by using the receiving sensors, and calculating a relative position of the unmanned aerial vehicle with respect to the user according to the distance signal; and a tracking module 403, for adjusting a horizontal position of the unmanned aerial vehicle according to the relative position of the unmanned aerial vehicle with respect to the user calculated by the positioning module 402, so that the relative position of the unmanned aerial vehicle with respect to the user agrees with a preset position, to realize automatic following of the unmanned aerial vehicle.

In the present embodiment, at least three ultrasonic receiving sensors are installed at different locations on the unmanned aerial vehicle, and the ultrasonic receiving sensors match with one ultrasonic transmitting sensor in the smart control device at the user side.

The positioning module 402 is particularly for, calculating distances from the user to each of the ultrasonic receiving sensors on the unmanned aerial vehicle according to time of the ultrasonic signals transmitted by the user reaching each of the ultrasonic receiving sensors on the unmanned aerial vehicle respectively; and calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors.

In the present embodiment, the receiving sensors 401, the positioning module 402 and the tracking mode 403 of the following device for an unmanned aerial vehicle 40 are all provided in the unmanned aerial vehicle. In other embodiments of this Application, some or all of the receiving sensors 401, the positioning module 402 and the tracking mode 403 of the following device for an unmanned aerial vehicle 40 may be independently provided outside the unmanned aerial vehicle.

In the present embodiment, four ultrasonic receiving sensors are installed on the unmanned aerial vehicle, the unmanned aerial vehicle is a quad-rotor unmanned aerial vehicle, configuring the locations of the ultrasonic receiving sensors to make the ultrasonic receiving sensors connecting lines form a cross, and the cross point to be the center point of the unmanned aerial vehicle.

The positioning module 402 is particularly for, establishing a space rectangular coordinate system by using the center point of the unmanned aerial vehicle as an origin, a direction of the connecting line of the two ultrasonic receiving sensors which passes through the origin as a horizontal coordinate axis, and a direction perpendicular to the horizontal coordinate axis as a vertical coordinate axis, defining the current location coordinate of the user as (x, y, z), and calculating coordinate values of a current location of the user by using the following formulas:

$$\begin{cases} (y-l)^2 + x^2 + z^2 = n_2^2 \\ (y-l)^2 + x^2 + z^2 = n_3^2 \\ (x-l)^2 + y^2 + z^2 = n_4^2 \\ (x+l)^2 + y^2 + z^2 = n_1^2 \end{cases}$$

where l is a distance from the center point of the unmanned aerial vehicle to each of the ultrasonic receiving sensors, $n_1$ is a distance from the user to a first ultrasonic receiving sensor, $n_2$ is a distance from the user to a second ultrasonic receiving sensor, $n_3$ is a distance from the user to a third ultrasonic receiving sensor, and $n_4$ is a distance from the user to a fourth ultrasonic receiving sensor; and obtaining the relative position of the center point of the unmanned aerial vehicle with respect to the user according to the coordinate values of the current location of the user.

It should be noted that, the working process of the following device for an unmanned aerial vehicle of the present embodiment is corresponding to the implementing steps of the following method for an unmanned aerial vehicle of the prior embodiments, and the particular working flow of the following device for an unmanned aerial vehicle may be referred to the relevant contents of the following method for an unmanned aerial vehicle described above, and is not repeated here.

Fifth Embodiment

Figure 5:
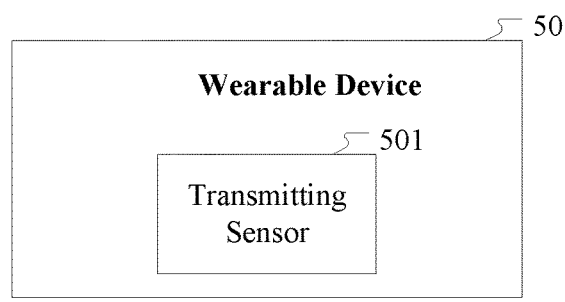
FIG. 5 is a structural block diagram of a wearable device according to an embodiment of this Application.

FIG. 5 is a structural block diagram of a wearable device according to an embodiment of this Application. Referring to FIG. 5, the present embodiment provides a wearable device 50 which is provided with one transmitting sensor 501.

The transmitting sensor 501 matches with a plurality of receiving sensors on an unmanned aerial vehicle, and is for transmitting a distance signal to the unmanned aerial vehicle in real time, to enable the unmanned aerial vehicle to calculate a relative position of the unmanned aerial vehicle with respect to a user according to the received distance signal, and adjust a horizontal position of the unmanned aerial vehicle according to the relative position, so that the relative position of the unmanned aerial vehicle with respect to the user to agrees with a preset position.

In the present embodiment, the wearable device 50 is an smart watch or an smart bracelet, or other smart wearable products having the corresponding function, such as smart glasses, smart earphones, smart costumes or shoes. The transmitting sensor 501 is an infrared transmitting sensor, and the receiving sensors are infrared receiving sensors. In other embodiments of this Application, the transmitting sensor 501 may also be an ultrasonic transmitting sensor, which is not limited.

In conclusion, the automatically following device and method of the unmanned aerial vehicle of this Application uses matching single-transmission multiple-receiving sensors (namely, one signal transmitting sensor provided on the user side and a plurality of signal receiving sensors provided at the unmanned aerial vehicle) to position the current location of the user and further determine the relative position (namely, the direction and location information) of the unmanned aerial vehicle with respect to the user, and adjusts the horizontal position of the unmanned aerial vehicle with respect to the user after obtaining the relative position of the unmanned aerial vehicle with respect to the user, so that it agrees with the preset position. Thereby, the method can maintain the relatively stationary relation between the unmanned aerial vehicle and the user, to realize the automatic following of the unmanned aerial vehicle, and especially when the user is moving, the user experience can be greatly enhanced by realizing the automatic following effect of the unmanned aerial vehicle.

In addition, this Application further provides a wearable device, and the transmitting sensor provided in the wearable device can transmit signals to a plurality of matching receiving sensors on the unmanned aerial vehicle, so as to realize the automatic following by the unmanned aerial vehicle to the user wearing the wearable device.

The above description is merely preferable embodiments of this Application, and is not intended to limit the protection scope of this Application. Any modifications, equivalent substitutions or improvements made within the spirit and principle of this Application shall all be included in the protection scope of this Application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A following method used for an unmanned aerial vehicle, wherein the unmanned aerial vehicle is installed with a plurality of receiving sensors at different locations, and a flying height of the unmanned aerial vehicle is predetermined, wherein the following method comprises:

establishing pairing connections between the plurality of receiving sensors and one transmitting sensor in a smart control device at a user side to realize identity matching;

receiving a distance signal transmitted by the one transmitting sensor in the smart control device in real time by using the plurality of receiving sensors, and calculating a relative position of the unmanned aerial vehicle with respect to the user according to the distance signal; and adjusting a horizontal position of the unmanned aerial vehicle according to the relative position so that the relative position of the unmanned aerial vehicle with respect to the user agrees with a preset position, to realize automatic following of the unmanned aerial vehicle to the user, wherein the horizontal position refers to a location at a predetermined height of the unmanned aerial vehicle above the user and on a circumference of a circle with the user as its center and a predetermined value as its radius.

2. The method according to claim 1, wherein at least three ultrasonic receiving sensors at different locations are installed on the unmanned aerial vehicle, and the at least three ultrasonic receiving sensors match with one ultrasonic transmitting sensor in the smart control device at the user side.

3. The method according to claim 2, wherein the step of calculating a relative position of the unmanned aerial vehicle with respect to the user according to the received distance signal comprises:

calculating distances from the user to each of the ultrasonic receiving sensors on the unmanned aerial vehicle according to time of the ultrasonic signals transmitted by the one transmitting sensor in the smart control device reaching each of the ultrasonic receiving sensors on the unmanned aerial vehicle respectively; and calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors.

4. The method according to claim 3, wherein four ultrasonic receiving sensors are installed on the unmanned aerial vehicle, the unmanned aerial vehicle is a quad-rotor unmanned aerial vehicle, and, the locations of the four ultrasonic receiving sensors are configured to make its connecting lines form a cross, and its cross point to be the center point of the unmanned aerial vehicle.

5. The method according to claim 4, wherein each of the ultrasonic receiving sensors is installed under one rotor wing of the quad-rotor unmanned aerial vehicle respectively.

6. The method according to claim 4, wherein the step of calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors comprises:

establishing a space rectangular coordinate system by using the center point of the unmanned aerial vehicle as an origin, a direction of the connecting line of the two ultrasonic receiving sensors which passes through the origin as a horizontal coordinate axis, and a direction perpendicular to the horizontal coordinate axis as a vertical coordinate axis, and calculating coordinate values of a current location of the user by using the following formulas:

$$\begin{cases} (y-l)^2 + x^2 + z^2 = n_2^2 \\ (y+l)^2 + x^2 + z^2 = n_3^2 \\ (x-l)^2 + y^2 + z^2 = n_4^2 \\ (x+l)^2 + y^2 + z^2 = n_1^2 \end{cases}$$

where (x, y, z) is a current location coordinate of the user, l is a distance from the center point of the unmanned aerial vehicle to each of the ultrasonic receiving sensors, $n_1$ is a distance from the user to a first ultrasonic receiving sensor, $n_2$, is a distance from the user to a second ultrasonic receiving sensor, $n_3$ is a distance from the user to a third ultrasonic receiving sensor, and $n_4$ is a distance from the user to a fourth ultrasonic receiving sensor; and obtaining the relative position of the center point of the unmanned aerial vehicle with respect to the user according to the coordinate values of the current position of the user.

7. The method according to claim 6, wherein the step of adjusting a horizontal position of the unmanned aerial vehicle according to the relative position so that the relative position of the unmanned aerial vehicle with respect to the user agrees with preset position comprises:

adjusting the horizontal position of the unmanned aerial vehicle with respect to the user by adjusting a flying speed of the unmanned aerial vehicle with a proportion integration differentiation controller (PID) according to the relative position of the unmanned aerial vehicle with respect to the user, so that the relative position of the unmanned aerial vehicle with respect to the user agrees with the preset position, to realize automatic following.

8. The method according to claim 1, wherein at least three infrared receiving sensors are installed at different locations on the unmanned aerial vehicle, and the at least three infrared receiving sensors match with one infrared transmitting sensor in the smart control device at the user side.

9. A following device used for an unmanned aerial vehicle, wherein the unmanned aerial vehicle is installed with a plurality of receiving sensors at different locations, a flying height of the unmanned aerial vehicle is predetermined, and the following device comprises: a processor and a computer readable medium, wherein the computer readable medium stores a computer readable code that is readable by the processor, and the processor executes the computer readable code to perform the steps of:

establishing pairing connections between the plurality of receiving sensors and one transmitting sensor in a smart control device at a user side to realize identity matching;

receiving a distance signal transmitted by the one transmitting sensor in the smart control device in real time by using the plurality of receiving sensors, and calculating a relative position of the unmanned aerial vehicle with respect to the user according to the distance signal; and adjusting a horizontal position of the unmanned aerial vehicle according to the relative position so that the relative position of the unmanned aerial vehicle with respect to the user agrees with a preset position, to realize automatic following of the unmanned aerial vehicle to the user, wherein the horizontal position refers to a location at a predetermined height of the unmanned aerial vehicle above the user and on a circumference of a circle with the user as its center and a predetermined value as its radius.

10. The device according to claim 9, wherein at least three ultrasonic receiving sensors are installed at different locations on the unmanned aerial vehicle, and the at least three ultrasonic receiving sensors match with one ultrasonic transmitting sensor in the smart control device at the user side;

wherein the step of calculating a relative position of the unmanned aerial vehicle with respect to the user according to the received distance signal comprises:

calculating distances from the user to each of the ultrasonic receiving sensors on the unmanned aerial vehicle according to time of the ultrasonic signals transmitted by the one transmitting sensor in the smart control device reaching each of the ultrasonic receiving sensors on the unmanned aerial vehicle respectively; and calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors.

11. The device according to claim 10, wherein four ultrasonic receiving sensors are installed on the unmanned aerial vehicle, the unmanned aerial vehicle is a quad-rotor unmanned aerial vehicle, and, the locations of the ultrasonic receiving sensors are configured to make its connecting lines form a cross, and its cross point to be the center point of the unmanned aerial vehicle;

wherein the step of calculating a relative position of a center point of the unmanned aerial vehicle with respect to the user according to the distances from the user to each of the ultrasonic receiving sensors on the unmanned aerial vehicle, the location of the center point of the unmanned aerial vehicle, and distances from the center point of the unmanned aerial vehicle to each of the ultrasonic receiving sensors comprises:

establishing a space rectangular coordinate system by using the center point of the unmanned aerial vehicle as an origin, a direction of the connecting line of two ultrasonic receiving sensors which passes through the origin as a horizontal coordinate axis, and a direction perpendicular to the horizontal coordinate axis as a vertical coordinate axis, and calculating coordinate values of a current location of the user by using the following formulas:

$$\begin{cases} (y-l)^2 + x^2 + z^2 = n_2^2 \\ (y+l)^2 + x^2 + z^2 = n_3^2 \\ (x-l)^2 + y^2 + z^2 = n_4^2 \\ (x+l)^2 + y^2 + z^2 = n_1^2 \end{cases}$$

where (x, y, z) is a current location coordinate of the user, l is a distance from the center point of the unmanned aerial vehicle to each of the ultrasonic receiving sensors, $n_1$ is a distance from the user to a first ultrasonic receiving sensor, $n_2$ is a distance from the user to a second ultrasonic receiving sensor, $n_3$ is a distance from the user to a third ultrasonic receiving sensor, and $n_4$ is a distance from the user to a fourth ultrasonic receiving sensor; and obtaining the relative position of the center point of the unmanned aerial vehicle with respect to the user according to the coordinate values of the current location of the user.

12. The device according to claim 9, wherein at least three infrared receiving sensors are installed at different locations on the unmanned aerial vehicle, and the at least three infrared receiving sensors match with one infrared transmitting sensor in the smart control device at the user side.

13. A wearable device, wherein the wearable device is at a user side and provided with one transmitting sensor; and the transmitting sensor establishes pairing connections with a plurality of receiving sensors at different locations on an unmanned aerial vehicle to realize identity matching, and is for transmitting a distance signal to the plurality of receiving sensors on the unmanned aerial vehicle in real time, to enable the unmanned aerial vehicle to calculate a relative position of the unmanned aerial vehicle with respect to a user according to the received distance signal, and adjust a horizontal position of the unmanned aerial vehicle according to the relative position, so that the relative position of the unmanned aerial vehicle with respect to the user agrees with a preset position, to realize automatic following of the unmanned aerial vehicle to the user, wherein a flying height of the unmanned aerial vehicle is predetermined, and the horizontal position refers to a location at a predetermined height of the unmanned aerial vehicle above the user and on a circumference of a circle with the user as its center and a predetermined value as its radius.

14. The wearable device according to claim 13, wherein the wearable device is a smart watch, a smart bracelet, smart glasses or a smart earphone.

15. The wearable device according to claim 13, wherein the transmitting sensor is an infrared transmitting sensor, and the receiving sensors are infrared receiving sensors;

or, the transmitting sensor is an ultrasonic transmitting sensor, and the receiving sensors are ultrasonic receiving sensors.

* * * * *